US010247272B2

(12) United States Patent
Proeschel et al.

(10) Patent No.: US 10,247,272 B2
(45) Date of Patent: Apr. 2, 2019

(54) HYDRAULIC DAMPER HAVING SELF-ADJUSTING WEAR BAND

(71) Applicant: BeijingWest Industries Co., Ltd., Beijing (CN)

(72) Inventors: Andrew Kegan Proeschel, Beavercreek, OH (US); Guy Tessier, Fontenay sous Bois (FR)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/623,859

(22) Filed: Jun. 15, 2017

(65) Prior Publication Data
US 2018/0038443 A1 Feb. 8, 2018

Related U.S. Application Data

(60) Provisional application No. 62/371,254, filed on Aug. 5, 2016.

(51) Int. Cl.
*F16F 9/512* (2006.01)
*B60G 17/08* (2006.01)
(Continued)

(52) U.S. Cl.
CPC .............. *F16F 9/512* (2013.01); *B60G 17/08* (2013.01); *F16F 9/3214* (2013.01);
(Continued)

(58) Field of Classification Search
CPC .... F16F 9/368; F16F 9/53; F16F 9/535; F16F 9/512; F16F 9/3405; F16F 9/3214;
(Continued)

(56) References Cited

U.S. PATENT DOCUMENTS 3,155,015 A 11/1964 Orville
3,447,427 A 6/1969 Scott
(Continued)

FOREIGN PATENT DOCUMENTS

CN 2515456 10/2002
CN 2632389 8/2004
(Continued)

OTHER PUBLICATIONS

EPO machine translation, DE 43 42 755, Berner et al., Jun. 1995. (Year: 1995).*
(Continued)

*Primary Examiner* — Thomas J Williams
(74) *Attorney, Agent, or Firm* — William H. Honaker; Dickinson Wright PLLC (57) ABSTRACT

A hydraulic damper assembly including a housing that extends about and along an axis and defines an interior wall and a chamber for holding a fluid. A piston assembly is disposed in the chamber and axially moveable therein. The piston assembly includes a core. A wear band is disposed about the core and has an inside surface and an outside surface. The inside surface of the wear band defines at least one groove in fluid communication with the chamber for allowing the fluid to bias the wear band toward the interior wall of the housing during the passage of the fluid though the at least one groove during movement of the piston assembly.

19 Claims, 7 Drawing Sheets

(51) Int. Cl.
*F16J 1/08* (2006.01)
*F16F 9/34* (2006.01)
*F16F 9/53* (2006.01)
*F16F 9/32* (2006.01)
*F16J 1/09* (2006.01)

(52) U.S. Cl.
CPC ............ *F16F 9/3405* (2013.01); *F16F 9/535* (2013.01); *F16J 1/08* (2013.01); *F16F 9/3415* (2013.01); *F16J 1/09* (2013.01)

(58) Field of Classification Search
CPC . F16J 1/02; F16J 1/06; F16J 1/08; F16J 1/09; B60G 17/08
USPC .................................................... 188/322.18
See application file for complete search history.

(56) References Cited

U.S. PATENT DOCUMENTS

| | | | |
|---|---|---|---|
| 4,765,444 A | 8/1988 | Bauer et al. | |
| 4,821,850 A | 4/1989 | Geiling et al. | |
| 5,785,160 A * | 7/1998 | Grundei | F16F 9/3214 188/282.6 |
| 5,878,851 A | 3/1999 | Carlson et al. | |
| 6,311,810 B1 * | 11/2001 | Hopkins | F16F 9/535 188/267.2 |
| 6,386,343 B1 | 5/2002 | Robinson et al. | |
| 6,464,051 B2 | 10/2002 | Lisenker et al. | |
| 6,481,336 B2 * | 11/2002 | May | F04B 53/143 188/322.18 |
| 7,753,180 B2 | 7/2010 | Lun | |
| 7,950,508 B2 | 5/2011 | Jin et al. | |
| 8,327,984 B2 | 12/2012 | Foister et al. | |
| 8,348,028 B2 * | 1/2013 | Zimmer | F16F 7/09 188/134 |
| 8,490,762 B2 | 7/2013 | Lopez et al. | |
| 2009/0294231 A1 | 12/2009 | Carlson et al. | |
| 2010/0006381 A1 | 1/2010 | Lee et al. | |

FOREIGN PATENT DOCUMENTS

| | | | | |
|---|---|---|---|---|
| DE | 4342755 A1 | 6/1995 | | |
| JP | 57186646 | 11/1982 | | |
| JP | 57186646 A | * 11/1982 | ............. | F16F 9/368 |
| JP | 63187774 U | 12/1988 | | |
| JP | 1115066 U | 8/1989 | | |
| JP | 2011522196 A | 7/2011 | | |
| WO | 2006029421 A1 | 3/2006 | | |
| WO | 2013137199 | 9/2013 | | |

OTHER PUBLICATIONS

Extended European Search Report dated Dec. 12, 2017 (7 Pages).
First Office Action issued for corresponding Japanese Patent Application 2017-150332 dated Apr. 24, 2018.
First Office Action and search report dated Nov. 1, 2018 for counterpart Chinese patent application No. 201710514469.0, along with machine EN translation downloaded from EPO.
Decision of Refusal issued for corresponding Japanese Patent Application 2017-150332 dated Nov. 27, 2018.

* cited by examiner

HYDRAULIC DAMPER HAVING SELF-ADJUSTING WEAR BAND

CROSS REFERENCE TO RELATED APPLICATION

This application claims the benefit of U.S. Provisional Patent Application Ser. No. 62/371,254 filed on Aug. 5, 2016, and titled "Hydraulic Damper Having Self-Adjusting Wear Band", the entire disclosure of which is hereby incorporated by reference.

TECHNICAL FIELD

A hydraulic damper assembly for a vehicle suspension system.

BACKGROUND OF THE INVENTION

Hydraulic damper/strut assemblies are commonly used in vehicle suspension systems for bearing a load and damping vibrations between a body and wheel assembly of the vehicle. An example of a hydraulic damper assembly is disclosed in U.S. Pat. No. 3,155,015 to Orville Derdnand Genz which includes a housing that extends about and along an axis and defines an interior wall and a chamber for holding a fluid. A piston assembly that has a core is disposed in the chamber and is axially moveable in the chamber for providing a damping effect during movement of the piston assembly. A wear band is disposed about the core for engaging the interior wall of the housing during movement of the piston assembly to allow the strut to take on side load forces.

An issue with such hydraulic damper assemblies is that the wear band and/or interior wall of the housing may erode over time, which may undesirably change the damping characteristics of the damper assembly. Accordingly there remains a need for improvements to hydraulic damper assemblies.

SUMMARY OF THE INVENTION

According to an aspect of the disclosure, a hydraulic damper assembly is provided. The hydraulic damper assembly includes a housing that extends about and along an axis and defines an interior wall and a chamber for holding a fluid. A piston assembly is disposed in the chamber and is axially moveable therein. The piston assembly includes a core. A wear band is disposed about the core and has an inside surface and an outside surface. The inside surface of the wear band defines at least one groove that is in fluid communication with the chamber for allowing the fluid to bias the wear band toward the interior wall of the housing during the passage of the fluid through the at least one groove during movement of the piston assembly.

According to another aspect of the disclosure, a hydraulic damper assembly is provided that includes a tubular housing that extends about and along an axis and defines an interior wall and a chamber. A piston assembly is disposed in the chamber and is axially moveable therein. The piston assembly includes a core that has a side surface. A piston ring is disposed about the core and presents an outer surface and an inner surface. At least one passage is defined between the side surface of the core and the inner surface of the piston ring. A wear band is disposed about the piston ring and has an inside surface and an outside surface and extends axially between a first end and a second end. The inside surface of the wear band defines at least one groove that is in fluid communication with the chamber for allowing the fluid to bias the wear band toward the interior wall of the housing during the passage of the fluid through the groove during axial movement of the piston assembly.

The invention in its broadest aspect therefore provides a self-adjusting wear band that doesn't modify the damping characteristics of the damper assembly as the wear band or interior wall of the housing erode over time. More specifically, during movement of the piston assembly, the at least one groove on the inside surface of the wear band allows fluid to pass into the area between the piston core and the wear band, which biases the wear band against the interior wall of the tubular housing. This allows the wear band to automatically adjust for component wear.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a hydraulic damper assembly 20 is generally shown for use in a suspension system of a vehicle. It should be appreciated that the subject hydraulic damper assembly 20 could be utilized on various vehicles including, but not limited to, automobiles, motorcycles and all-terrain vehicles.

Figure 2:
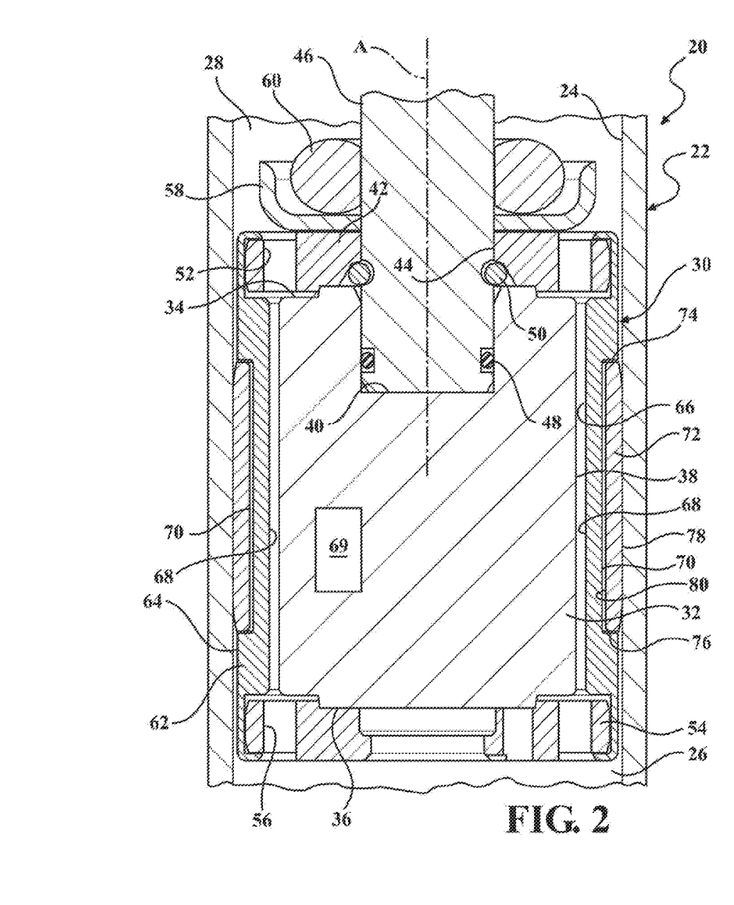
FIG. 2 is a front cutaway view of an embodiment of a piston assembly and housing.

As best illustrated in FIG. 2, the damper assembly 20 includes a tubular housing 22 that extends about and along a center axis A and defines an interior wall 24 and a chamber 26, 28. The housing 22 may be connected to a first component of the vehicle, such as a wheel assembly. A damping fluid, such as an MR fluid is contained in the chamber 26, 28. It should be appreciated that in certain embodiments, the interior wall 24 of the housing 22 may be chrome plated.

Figure 1:
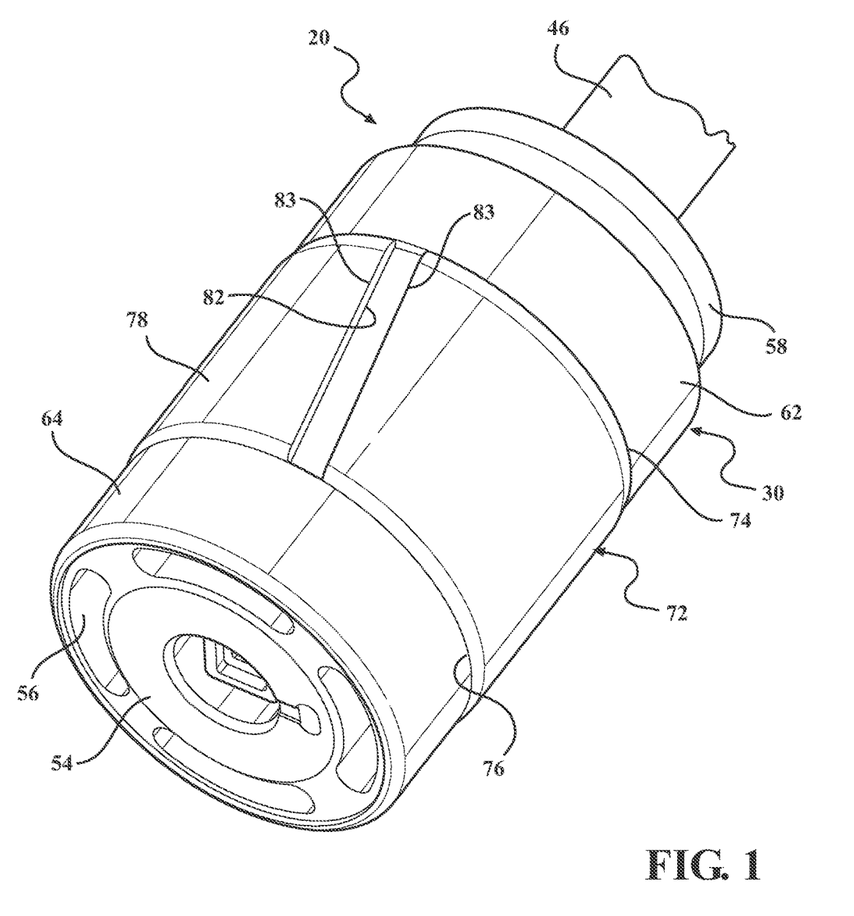
FIG. 1 is a perspective view of an embodiment of a piston assembly including a wear band disposed about a piston ring.

As best illustrated in FIGS. 1-2, a piston assembly 30 is disposed in the chamber 26, 28 and divides the chamber 26, 28 into a compression section 26 and a rebound section 28. The piston assembly 30 is axially moveable relative to the housing 22 and may be connected to a second component of the vehicle, such a body.

The piston assembly 30 includes a core 32 that has a generally cylindrical shape and extends axially between a top surface 34 and a bottom surface 36 along a side surface 38. The top surface 34 of the core 32 defines a depression 40 along the axis A.

A generally disc-shaped upper plate 42 abuts the top surface 34 of the core 32. The upper plate 42 defines an opening 44 that extends therethrough along the axis A. A rod 46 is received by the opening 44 of the upper plate 42 and the depression 40 of the core 32. The rod 46 is secured to the upper plate 42 and core 32 in the opening 44 and depression 40. A first seal 48 is disposed between the rod 46 and the core 32, and a second seal 50 is disposed between the rod 46, core 32 and upper plate 42. The seals 48, 50 inhibit fluid from passing between the piston and the core 32/upper plate 42. The upper plate 42 further defines a plurality of circumferentially-spaced upper plate apertures 52 that each extend axially therethrough.

A cushion seat 58 is disposed against the upper plate 42. Furthermore, a cushioning element 60 is disposed against the spring seat for cushioning the deceleration of the piston assembly 30.

A generally disc-shaped lower plate 54 is disposed against the bottom surface 36 of the core 32. The lower plate 54 defines a plurality of lower plate apertures 56 that extend axially therethrough and are circumferentially spaced from one another, each in alignment with one of the upper plate apertures 52.

A generally tube-shaped piston ring 62 is disposed radially about the core 32, upper plate 42 and lower plate 54. The piston ring 62 presents an outer surface 64 and an inner surface 66. A plurality of passages 68 are defined between the side surface 38 of the core 32 and the inner surface 66 of the piston ring 62, each in axial alignment with one of the upper plate apertures 52 and one of the lower plate apertures 56. The passages 68 allow the hydraulic fluid to pass therethough during axial movement of the piston assembly 30 to provide the damping effect. It should be appreciated that one or more electromagnetic coils 69 (schematically shown in FIG. 2) may be integrated into the core 32 for providing a magnetic field across the passage 68 to change the viscosity of MR fluid contained therein to modify the damping characteristics of the damper assembly 20.

Figure 8:
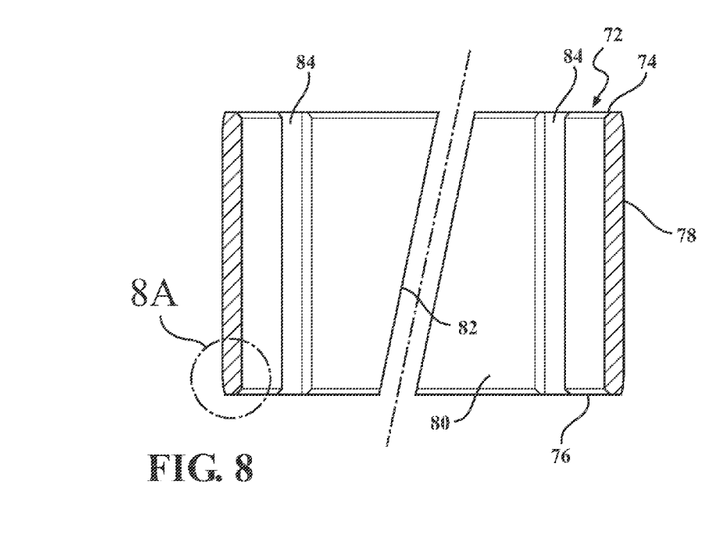
FIG. 8 is a front cutaway view of the wear band of FIG. 5.
Figure 8A:
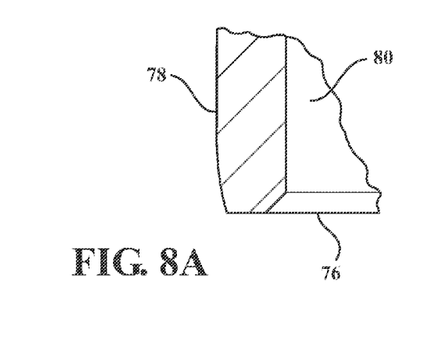
FIG. 8A is a magnified view of a second end of the wear band of FIG. 8.
Figure 9:
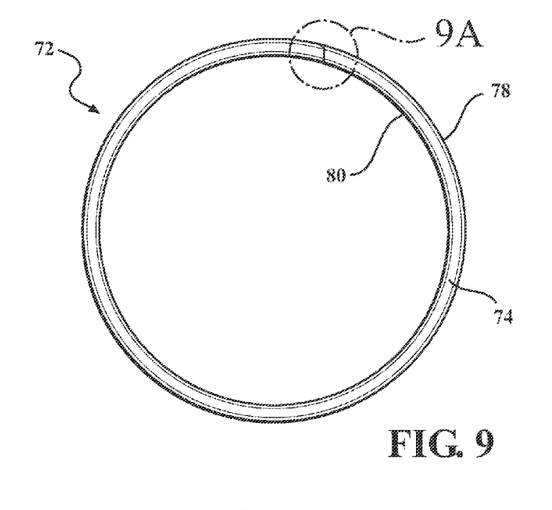
FIG. 9 is a top view of the wear band of FIG. 5 in a closed position.
Figure 9A:
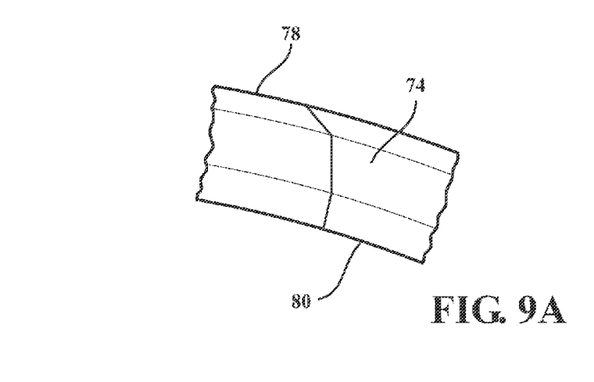
FIG. 9A is a magnified view of a second end of the wear band of FIG. 9.

The outer surface 64 of the piston ring 62 defines a recess 70 that extends annularly about the piston ring 62. A wear band 72 is received by the recess 70 of the piston ring 62. The wear band 72 extends axially between a first end 74 and a second end 76, and as illustrated in FIGS. 2-3 and 7-9A, has an outside surface 78 and an inside surface 80. As shown in FIGS. 8-9A, the wear band 72 tapers radially inwardly adjacent the first and second ends 74, 76. Referring to FIGS. 1, 5, 7 and 8, the wear band 72 defines at least one gap 82 that extends between the first and second ends 74, 76 of the wear band 72 to present a pair of edges 83 in spaced relationship with one another. The gap 82 of the wear band 72 extends at an angle relative to the axis A. It should be appreciated that the angle of the gap 82 ensures that radial loads are carried by the outer surface 78 of the wear band 72.

Figure 2A:
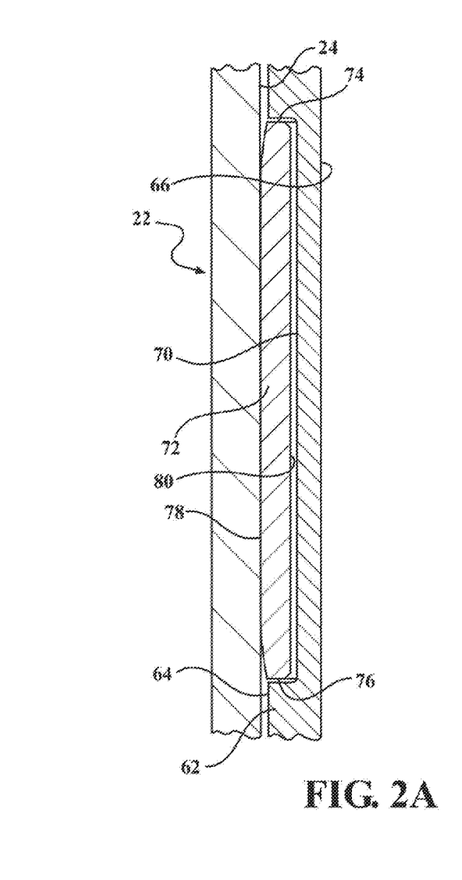
FIG. 2A is a magnified view of a wear band in FIG. 2.

As best illustrated in FIGS. 3, 4, 6, 7A and 8, the inside surface 80 of the wear band 72 defines at least one groove 84 that is in fluid communication with the chamber 26, 28. As best illustrated in FIG. 2A, the groove 84 allows fluid to pass into the area between the outer surface 64 of the piston ring 62 and inside surface 80 of the wear band 72 in the groove 84 during axial movement of the piston assembly 30, which therefore biases the wear band 72 toward the interior wall 24 of the housing 22. It should be appreciated that in embodiments of the hydraulic assembly in which no piston ring 62 is present, the fluid would pass directly between the side surface 38 of the core 32 and the inside surface 80 of the wear band 72 in the groove 84.

In the example embodiment, the groove 84 extends between the first and second ends 74, 76 of the wear band 72. It should be appreciated that the groove could alternatively extend from only one of the first and second ends 74, 76 along a predetermined distance toward the other of the first and second ends 74, 76.

Figure 3:
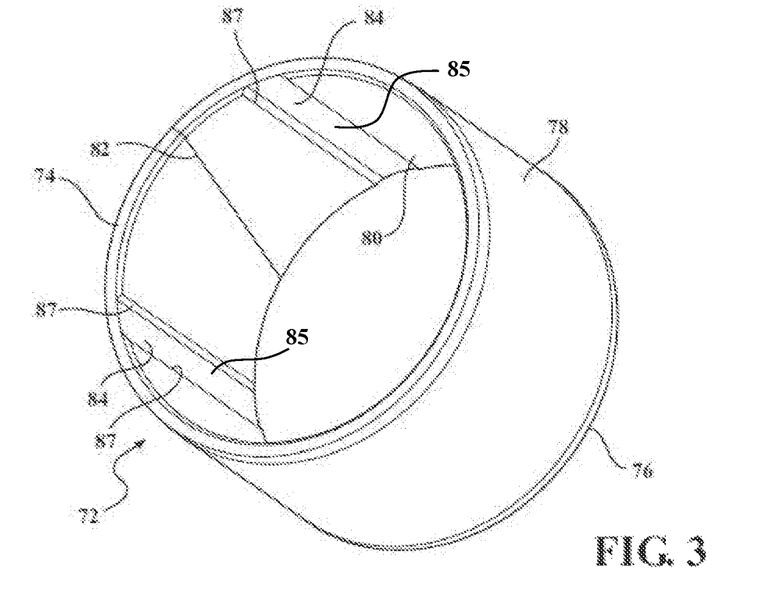
FIG. 3 is a left side perspective view of an embodiment of a wear band.
Figure 4:
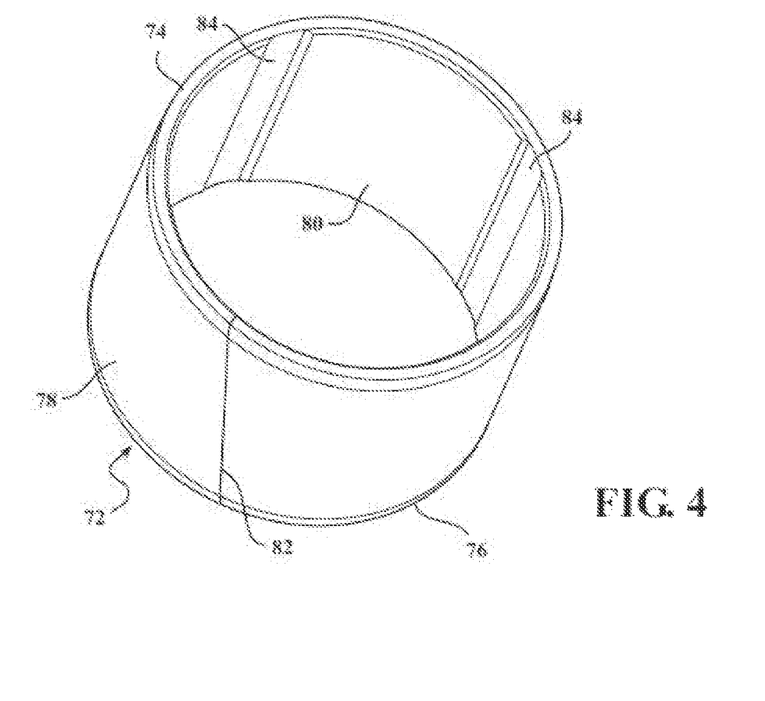
FIG. 4 is a right side perspective view of the wear band of FIG. 3.
Figure 5:
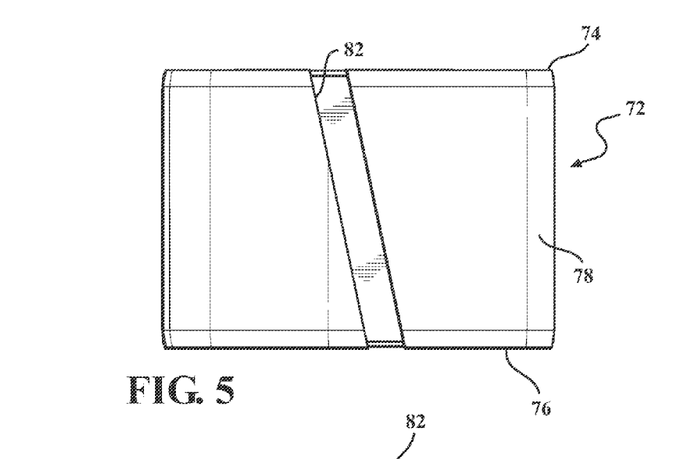
FIG. 5 is a front view of an embodiment of a wear band.
Figures 6, 7A:
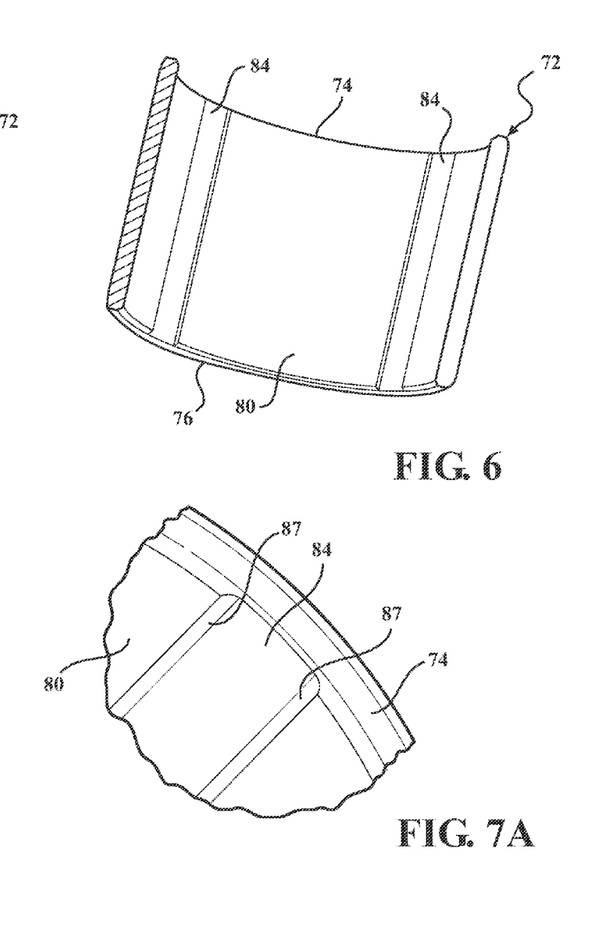
FIG. 6 is a perspective cutaway view of the wear band of FIG. 5.
FIG. 7A is a magnified view of an edge of the wear band of FIG. 7.
Figure 7:
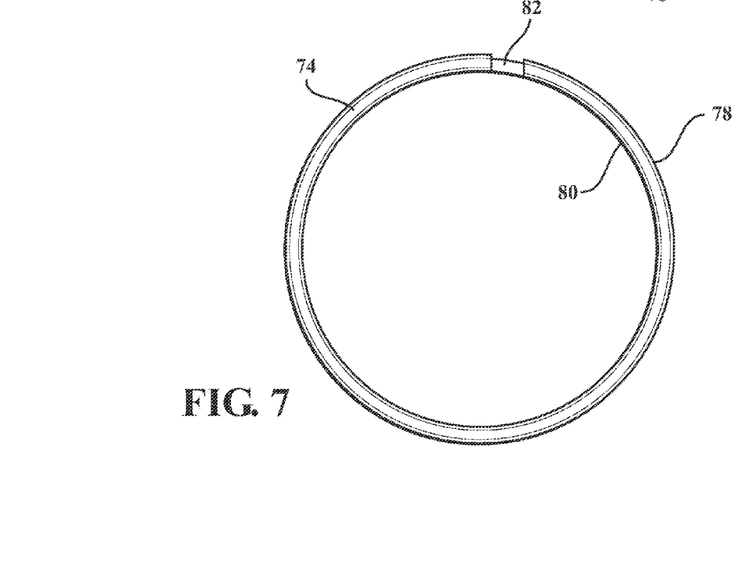
FIG. 7 is a top view of the wear band of FIG. 5 in an open position to define a gap.

It should be appreciated that any number of grooves 84 could be utilized, and the grooves 84 may be arranged in circumferentially and evenly spaced relationship with one another. In the example embodiment, each groove 84 extends axially along its entire length, but could alternatively extend at other angles or in other shapes. Furthermore, as best illustrated in FIG. 3, in the example embodiment the grooves 84 each are defined by a pair of spaced edge walls 87 and have a bottom surface 85 between the edge walls. It should be appreciated that the grooves 84 could have various cross-sectional shapes, e.g., an arc shape.

It should be appreciated that biasing the wear band 72 against the interior wall 24 of the housing 22 allows the wear band 72 to automatically adjust for component wear. More specifically, biasing the wear band 72 radially outwardly ensures that the wear band 72 engages the interior wall 24 of the housing 22 even after the wear band 72 and/or interior wall 24 of the housing 22 have worn. As such, correct dimensional tolerancing of the piston ring 62, wear band 72, grooves 84 and interior wall 24 of the housing 22 provide improved durability lifespan of the damper assembly 20.

Figure 10:
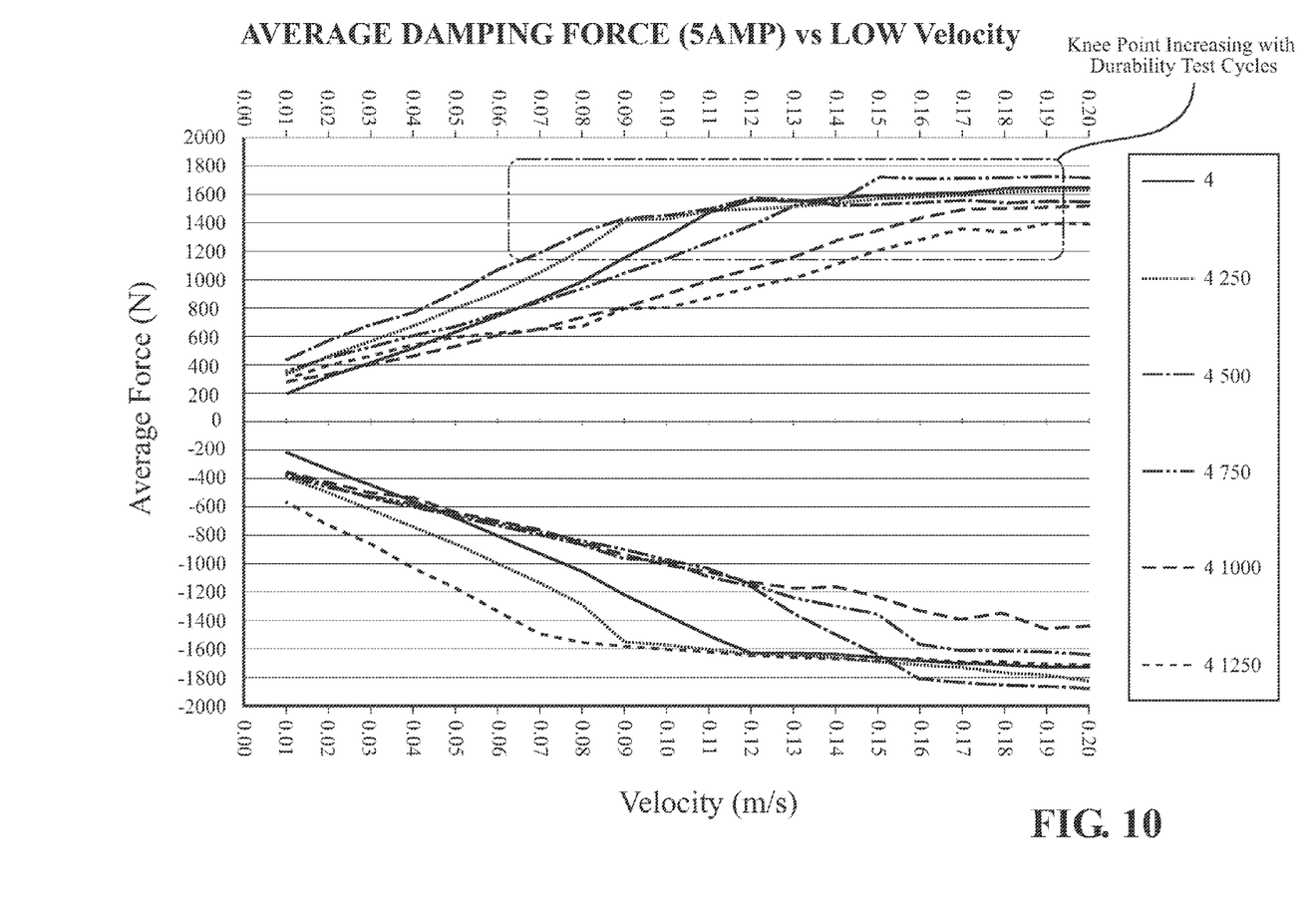
FIG. 10 is a graph presenting durability data for a damper assembly including a wear band without a groove.
Figure 11:
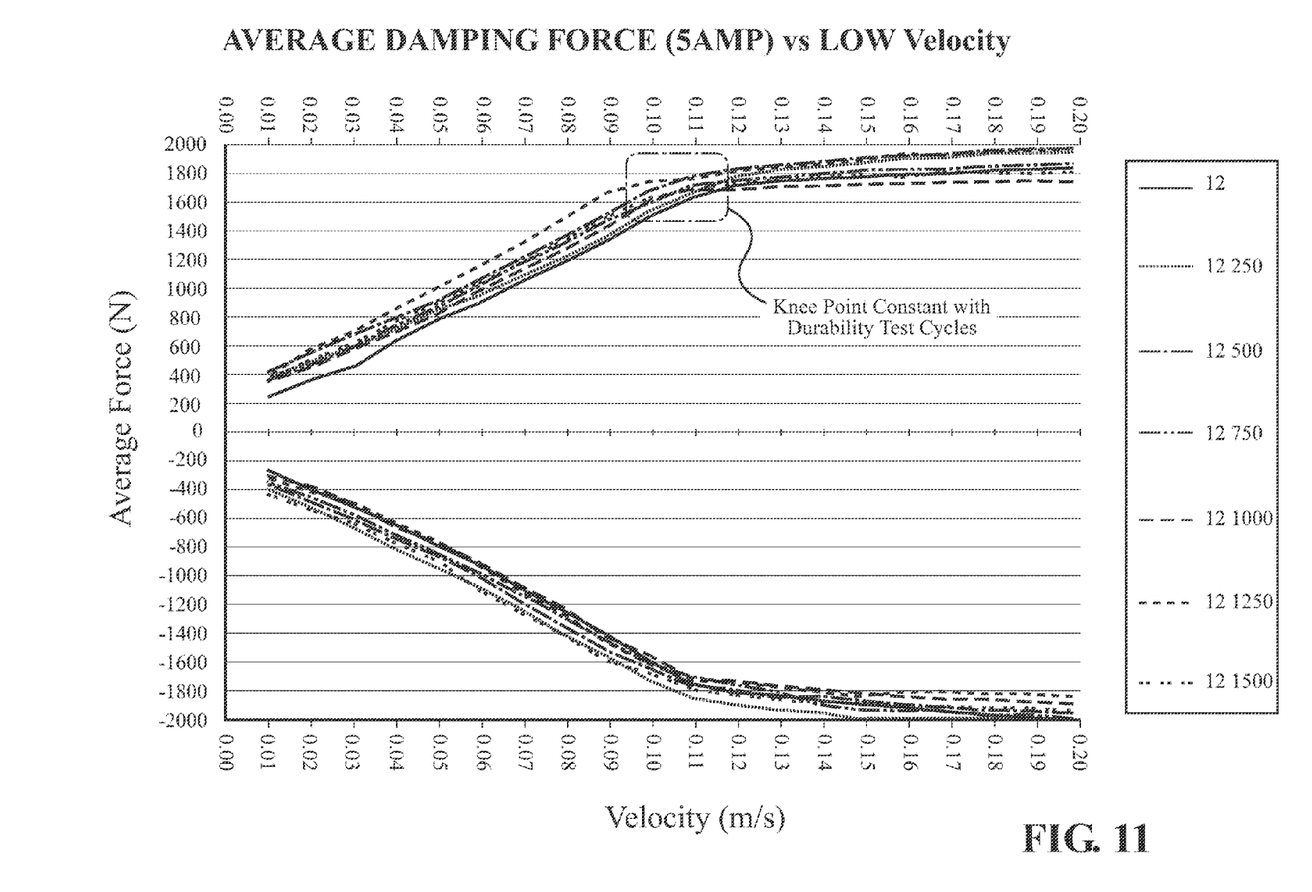
FIG. 11 is a graph presenting durability data for a damper assembly including a wear band with a groove.

FIGS. 10 and 11 present durability performance characteristics between an embodiment of an MR damper assembly 20 that is configured with a wear band 72 that does not include grooves 84, and an MR damper assembly 20 that is configured with a wear band 72 that includes grooves 84, respectively. More specifically, as illustrated in FIG. 10, the knee point of an on-state force velocity curve begins to shift as components of the damper assembly 20 experience wear. This is due to an additional area bypass from component wear, thus causing the MR damper assembly to lose low velocity on-state damping force at a high rate. On the other hand, as illustrated in FIG. 11, with a groove 84, the knee point shift of an on-state damping force as the wear occurs through the life of the damper assembly 20 is eliminated. In other words, FIGS. 10 and 11 demonstrate that the groove 84 provides reduced on-state damping force loss (knee point shift) of the MR damper assembly 20 as wear occurs through the life of the MR damper/strut assembly 20.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the assembly claims refers to an antecedent that is a positive recitation meant to be included in the coverage of the claims whereas the word "the" precedes a word not meant to be included in the coverage of the claims.

What is claimed is:

1. A hydraulic damper assembly comprising:
a housing extending about and along an axis and defining an interior wall and a chamber for holding a fluid;
a piston assembly disposed in said chamber and axially moveable therein;
said piston assembly including a core;
a wear band disposed about said core and having an inside surface and an outside surface; and
said inside surface of said wear band defining at least one groove in fluid communication with said chamber for allowing the fluid to bias said wear band toward said interior wall of said housing during the passage of the fluid through said at least one groove during the movement of said piston assembly;
wherein said wear band defines at least one gap extending between first and second ends of said wear band and defining a pair of edges in spaced relationship with one another, and wherein said at least one groove is spaced from said at least one gap.

2. A hydraulic damper assembly as set forth in claim 1 wherein said wear band extends axially between a first end and a second end, and said groove extends from one of said first and second ends of said wear band toward the other of said first and second ends.

3. A hydraulic damper assembly as set forth in claim 2 wherein said at least one groove extends between said first and second ends of said wear band.

4. A hydraulic damper assembly as set forth in claim 1 wherein said at least one groove extends axially along its entire length.

5. A hydraulic damper assembly as set forth in claim 1 wherein said at least one groove includes a plurality of said grooves.

6. A hydraulic damper assembly as set forth in claim 5 wherein said plurality of grooves are spaced evenly from one another circumferentially about said inside surface of said wear band.

7. A hydraulic damper assembly as set forth in claim 6 wherein said plurality of grooves each extend axially.

8. A hydraulic damper assembly as set forth in claim 1 wherein said at least one groove is defined by a pair of spaced edge walls and a bottom surface disposed between said spaced edge walls.

9. A hydraulic damper assembly as set forth in claim 1 further including a piston ring disposed about said core and presenting an outer surface and an inner surface;
said core having a side surface;
at least one passage defined between said side surface of said core and said inner surface of said piston ring; and
said wear band disposed about said piston ring such that said fluid passes between said groove and said outer surface of said piston ring during said movement of said piston assembly.

10. A hydraulic damper assembly as set forth in claim 9 wherein said outer surface of said piston ring defines an annular recess extending annularly about said axis, and said wear band is disposed in said annular recess.

11. A hydraulic damper assembly as set forth in claim 9 further including at least one magnetorheological coil connected to said core for selectively changing a viscosity of fluid passing through said passage defined between said side surface of said core and said inner surface of said piston ring.

12. A hydraulic damper assembly comprising:
a tubular housing extending about and along an axis and defining an interior wall and a chamber;
a piston assembly disposed in said chamber and axially moveable therein;
said piston assembly including a core having a side surface;
a piston ring disposed about said core and presenting an outer surface and an inner surface;
at least one passage defined between said side surface of said core and said inner surface of said piston ring;
a wear band disposed about said piston ring and having an inside surface and an outside surface and extending axially between a first end and a second end and; and
said inside surface of said wear band defining at least one groove in fluid communication with said chamber for allowing the fluid to bias said wear band toward said interior wall of said housing during the passage of the fluid through said groove during the axial movement of said piston assembly;
wherein said wear band defines at least one gap extending between first and second ends of said wear band and defining a pair of edges in spaced relationship with one another, and wherein said at least one groove is spaced from said at least one gap.

13. A hydraulic damper assembly as set forth in claim 12 wherein said at least one groove extends from one of said first and second ends of said wear band toward the other of said first and second ends of said wear band.

14. A hydraulic damper assembly as set forth in claim 13 wherein said at least one groove extends between said first and second ends of said wear band.

15. A hydraulic damper assembly as set forth in claim 12 wherein said at least one groove extends axially along its entire length.

16. A hydraulic damper assembly as set forth in claim 12 wherein said at least one groove includes a plurality of said grooves.

17. A hydraulic damper assembly as set forth in claim 16 wherein said plurality of grooves are spaced evenly from one another circumferentially about said inside surface of said wear band.

18. A hydraulic damper assembly as set forth in claim 16 wherein said plurality of grooves each extend axially.

19. A hydraulic damper assembly as set forth in claim 12 further including at least one magnetorheological coil embedded in said core for selectively changing a viscosity of fluid passing through said passage defined between said side surface of said core and said inner surface of said piston ring.

* * * * *